United States Patent
Naven

(10) Patent No.: US 8,644,326 B2
(45) Date of Patent: Feb. 4, 2014

(54) QUEUE PROCESSING METHOD

(75) Inventor: Finbar Naven, Cheshire (GB)

(73) Assignee: Micron Technology, Inc., Boise, ID (US)

( * ) Notice: Subject to any disclaimer, the term of this patent is extended or adjusted under 35 U.S.C. 154(b) by 386 days.

(21) Appl. No.: 12/410,704

(22) Filed: Mar. 25, 2009

(65) Prior Publication Data

US 2009/0252167 A1    Oct. 8, 2009

Related U.S. Application Data

(60) Provisional application No. 61/042,321, filed on Apr. 4, 2008.

(30) Foreign Application Priority Data

Apr. 4, 2008   (GB) .................................. 0806145.9

(51) Int. Cl.
    *H04L 12/54*     (2013.01)
(52) U.S. Cl.
    USPC ......................................... 370/412; 370/429
(58) Field of Classification Search
    None
    See application file for complete search history.

(56) References Cited

U.S. PATENT DOCUMENTS

| | | | |
|---|---|---|---|
| 5,809,522 A | 9/1998 | Novak et al. | |
| 6,201,807 B1 | 3/2001 | Prasanna | |
| 6,678,271 B1 * | 1/2004 | Flinsbaugh | 370/392 |
| 6,967,926 B1 * | 11/2005 | Williams et al. | 370/236 |
| 7,088,731 B2 | 8/2006 | Iny | |
| 7,145,914 B2 * | 12/2006 | Olarig et al. | 370/413 |
| 7,221,647 B2 * | 5/2007 | Moriwaki et al. | 370/230 |
| 7,260,104 B2 * | 8/2007 | Schmidt | 370/414 |
| 7,296,093 B1 * | 11/2007 | Olarig et al. | 709/250 |
| 7,324,438 B1 | 1/2008 | Savoldi et al. | |
| 7,447,197 B2 * | 11/2008 | Terrell et al. | 370/360 |
| 7,453,810 B2 * | 11/2008 | Zoranovic et al. | 370/236 |
| 7,483,631 B2 * | 1/2009 | Ovadia et al. | 398/57 |
| 7,539,133 B2 * | 5/2009 | van Haalen et al. | 370/229 |
| 7,596,086 B2 * | 9/2009 | Wang et al. | 370/230 |
| 7,660,239 B2 * | 2/2010 | Willhite et al. | 370/225 |
| 7,742,408 B2 * | 6/2010 | Miyoshi et al. | 370/230 |
| 2002/0003777 A1 | 1/2002 | Miyamoto | |
| 2002/0181481 A1 | 12/2002 | Iny | |
| 2005/0018701 A1 | 1/2005 | Dropps et al. | |
| 2005/0088969 A1 * | 4/2005 | Carlsen et al. | 370/229 |
| 2005/0147032 A1 | 7/2005 | Lyon et al. | |
| 2006/0251108 A1 | 11/2006 | Hendel et al. | |
| 2007/0153683 A1 * | 7/2007 | McAlpine | 370/229 |

FOREIGN PATENT DOCUMENTS

WO     WO 02/084957 A2     10/2002

OTHER PUBLICATIONS

International Search Report and Written Opinion for Application No. PCT/GB2009/000589 dated May 26, 2009 (12 pages).
United Kingdom Search Report for Application No. GB0806145.9 dated Jul. 3, 2008 (3 pages).
"Translation lookaside buffer," http:en.wikipedia.org/wiki/Translation_lookaside_buffer (5 pages) (accessed on Aug. 26, 2011).

\* cited by examiner

*Primary Examiner* — Gregory Sefcheck
(74) *Attorney, Agent, or Firm* — Dorsey & Whitney LLP

(57) ABSTRACT

A method of processing data packets, each data packet being associated with one of a plurality of entities. The method comprises storing a data packet associated with a respective one of said plurality of entities in a buffer, storing state parameter data associated with said stored data packet, the state parameter data being based upon a value of a state parameter associated with said respective one of said plurality of entities, and processing a data packet in said buffer based upon said associated state parameter data.

29 Claims, 9 Drawing Sheets

QUEUE PROCESSING METHOD

The present application claims priority, under 35 U.S.C. §119(a), to British Patent Application No. 0806145.9, filed Apr. 4, 2008, and claims the benefit under 35 U.S.C. §119(e) of U.S. Provisional Patent Application No. 61/042,321, filed Apr. 4, 2008, both of which are hereby expressly incorporated by reference in their entirety.

The present invention relates to a method of processing a queue of data packets.

It is often necessary to send data between devices in a computer system, for example it is often necessary to connect a processing device to a plurality of input and output devices. Appropriate data communication is achieved by connecting the devices in such a way as to allow them to send data to each other over a physical link, which may be a wired link or a wireless link.

It is known in the art to use a switch to route data packets from an output of one device to inputs of one or more other devices. Such a switch comprises one or more input ports arranged to allow the data packets to be received by the switch, and a plurality of output ports arranged to allow the data to be transmitted from the switch. Circumstances may arise where there is insufficient bandwidth on a connecting link or where a receiving device is busy processing previously received data such that data received at a switch cannot be sent from the switch to a receiving device through the appropriate output port. Switches may therefore contain a buffer to store incoming data packets as they are waiting to be switched to one or more appropriate output ports. It is known to store data in such a buffer in the form of one or more queues which temporarily store data received from a device until that data can be sent to a receiving device.

Many conventional computer systems do not share input/output (I/O) devices. That is, each computer has its own dedicated I/O devices. It is, however advantageous to allow the sharing of I/O devices such that a plurality of computers can access one or more shared I/O devices. This allows an I/O device to appear to a computer system to be dedicated (i.e. local) to that computer system, while in reality it is shared between a plurality of computers.

Sharing of I/O devices can be implemented using what is known as I/O virtualization. I/O Virtualization allows physical resources (e.g. memory) associated with a particular I/O device to be shared by a plurality of computers. One advantage of I/O virtualization is that it allows an I/O device to appear to function as multiple devices, each of the multiple devices being associated with a particular computer.

Sharing of I/O devices can lead to better resource utilisation, scalability, ease of upgrade, and improved reliability. One application of I/O virtualization allows I/O devices on a single computer to be shared by multiple operating systems running concurrently on that computer. Another application of I/O virtualization, known as multi-root I/O virtualization, allows multiple independent servers to share a set of I/O devices. Such servers may be connected together by way of a computer network.

In order to ensure ease of integration, flexibility and compatibility with existing system components it is necessary to be able to provide I/O virtualization transparently, without requiring changes to the applications or operating systems running on the servers. Each server should be able to operate independently and be unaware that it is sharing I/O resources with other servers. It is desirable to be able to reset a server and its I/O resources without impacting other running servers that are sharing the I/O resources.

In typical multi-root I/O virtualization (IOV) implementations, a switch having a plurality of ports connects multiple I/O devices to multiple independent servers. The switch provides queues allowing received data to be stored until onward transmission of the data to a destination is possible. This allows efficient utilisation of link bandwidth, maximising throughput and minimising congestion. These queues often comprise memory arranged as FIFO (first in, first out) queues. When a packet is received at the switch, it is stored in a queue until it can be sent to its intended destination. Since the queues operate on a first in, first out basis, a data packet that cannot be forwarded to its next destination prevents subsequent data packets from making forward progress, causing the queues to fill and resulting in congestion.

It is known in the art to use shared queues. Shared queues allow for more efficient use of resources and the design of more scalable and cost-efficient systems. Shared queues allow packets received at the switch from a plurality of inputs and destined for a plurality of outputs to be stored in the same queue.

However, shared queues create problems in applications where it is a requirement to allow individual servers to perform system resets independently of other servers sharing the same I/O devices. A shared queue can contain data packets interleaved from multiple sources. If a server is reset, it is desirable that only those data packets stored within the shared queue associated with that server are discarded. This requirement can be difficult to achieve in practise, as in standard systems, a reset causes data packets from all active servers within the queue to be discarded.

It is an object of an embodiment of the present invention to obviate or mitigate one or more of the problems outlined above.

According to a first aspect of the present invention there is provided a method of processing a data packets, each data packet being associated with one of a plurality of entities, the method comprising: storing a data packet associated with a respective one of the plurality of entities in a buffer; storing state parameter data associated with the stored data packet, the state parameter data being based upon a value of a state parameter associated with the respective one of the plurality of entities; and processing a data packet in the buffer based upon the associated state parameter data.

By keeping track of a state parameter associated with an entity and storing corresponding state parameter data for each data packet stored in the queue, embodiments of the invention allow server independence to be achieved. That is, by storing a state parameter associated with a particular entity, changes in a state of that entity can be monitored. In some embodiments it can be determined which data packets were sent before and after a change of the state parameter associated with a corresponding entity and consequently which data packets were sent before and after a change of state of the entity. Where the state parameter is updated to reflect events at the entity with which it is associated, processing of a data packet can be based upon events at the entity. State parameter values may be stored with data packets in the buffer. As such a data packet need only be examined when it is processed. As such, the processing of the queue need not change following an event at the entity with which a stored data packet is associated. Further, as only the state parameter needs updating, an event is reflected almost instantaneously allowing the buffer to respond to multiple events in sequence or in parallel. The state parameter data may be based upon a value of a state parameter associated with said respective one of said plurality of entities when the stored data packet is received or processed in some predetermined way.

The processing may comprise selecting a data packet for processing and processing the state parameter data associated with the selected data packet with reference to a current value of the state parameter associated with the respective entity. If the processing indicates a first relationship between the state parameter data associated with the selected data packet and the current value of the state parameter associated with the respective entity the method may further comprise transmitting the selected data packet to at least one destination associated with the selected data packet. If the processing indicates a second relationship between the state parameter data associated with the selected data packet and the current value of the state parameter associated with the respective entity the method may further comprise discarding the selected data packet.

For example, the first relationship could be equality, i.e. state parameter associated with the selected data packet and the current value of the state parameter associated with the respective entity match.

The state parameter may be a counter. In such a case the state parameter may be updated by incrementing its value. The state parameter data may be stored in the buffer alongside the data packet, or alternatively may be stored in other appropriate storage, preferably storage which is local to the buffer.

The buffer may be implemented as a queue, preferably a first-in, first-out queue.

The state parameter associated with an entity may be updated in response to at least one event associated with the entity. For example, the state parameter may update each time the entity is reset.

The entity may be a source of the data packet or a destination of the data packet. The entity may be a computing device. Alternatively, the entity may be a computer program running on a computing device. That is, a plurality of entities may be a plurality of different computer programs (e.g. different operating system instances) running on a common computer. Alternatively, a plurality of entities may comprise a plurality of computing devices.

According to a second aspect of the present invention, there is provided a method of storing data packets in a buffer, each data packet being associated with one of a plurality of entities, the method comprising: receiving a data packet associated with a respective one of the plurality of entities; determining a value of a state parameter associated with the respective one of the plurality of entities; storing the data packet in the buffer; and storing state parameter data based upon the determined value.

It will be appreciated that many features described in connection with the first aspect of the present invention can similarly be applied to the second aspect of the present invention.

According to a third aspect of the present invention, there is provided a computer apparatus for processing data packets. The apparatus comprises a memory storing processor readable instructions and a processor configured to read and execute instructions stored in the memory. The processor readable instructions comprise instructions controlling the processor to carry out a method as described above.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

Preferred embodiments of the present invention will now be described, by way of example, with reference to the accompanying drawings in which.

Figure 1:
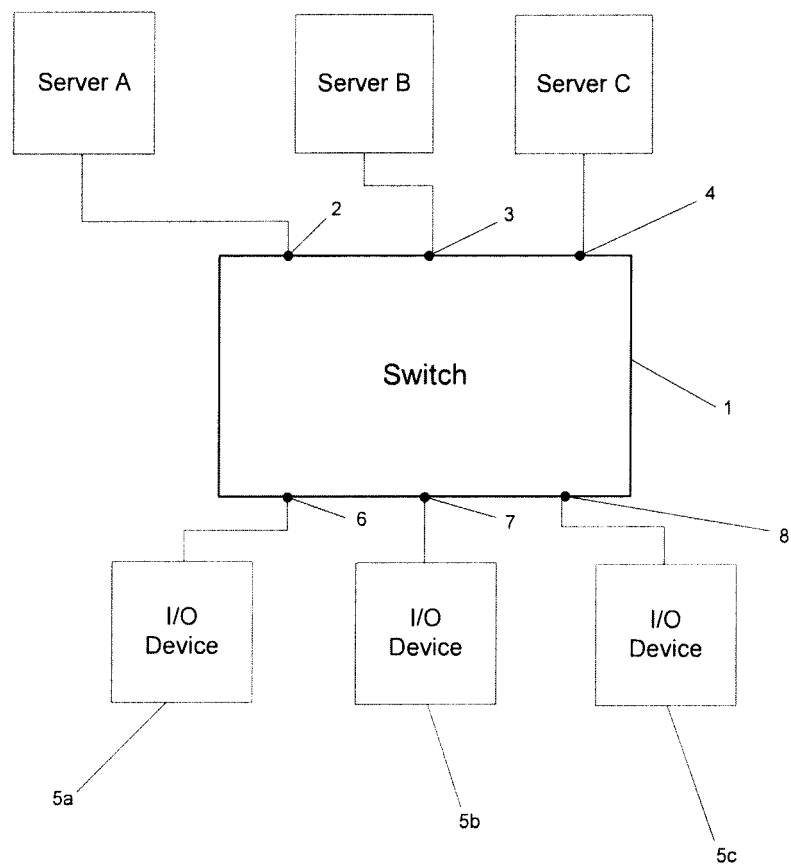
FIG. 1 is a schematic illustration of a plurality of servers connected to a plurality of input/output (I/O) devices by way of a switch.

Referring first to FIG. 1, three servers, server A, server B, server C are connected to a switch 1. The switch 1 has three ports 2, 3, 4 and the server A is connected to the port 2, the server B is connected to the port 3 and the server C is connected to the port 4. Three I/O devices (sometimes referred to as I/O endpoints) 5a, 5b and 5c are also connected to the switch 1. The I/O device 5a is connected to a port 6 of the switch 1, the I/O device 5b is connected to a port 7 of the switch 1 while the I/O device 5c is connected to a port 8 of the switch 1.

The servers A, B, C communicate with the I/O devices 5a, 5b, 5c by sending and receiving data packets through the switch 1. Each of the Servers A, B, C may transmit data packets to and receive data packets from some or all of the I/O devices 5a, 5b, 5c.

Each of the shared I/O devices 5a, 5b, 5c may have a plurality of independent functions. That is, for example, the shared I/O device 5a may appear to the servers A, B, C as a plurality of separate devices. The servers A, B, C may be given access to some or all of the functions of the I/O devices 5a, 5b, 5c. The I/O devices 5a, 5b, 5c can take any suitable form, and can be, for example, network interface cards, storage devices, or graphics rendering devices.

Figure 2:
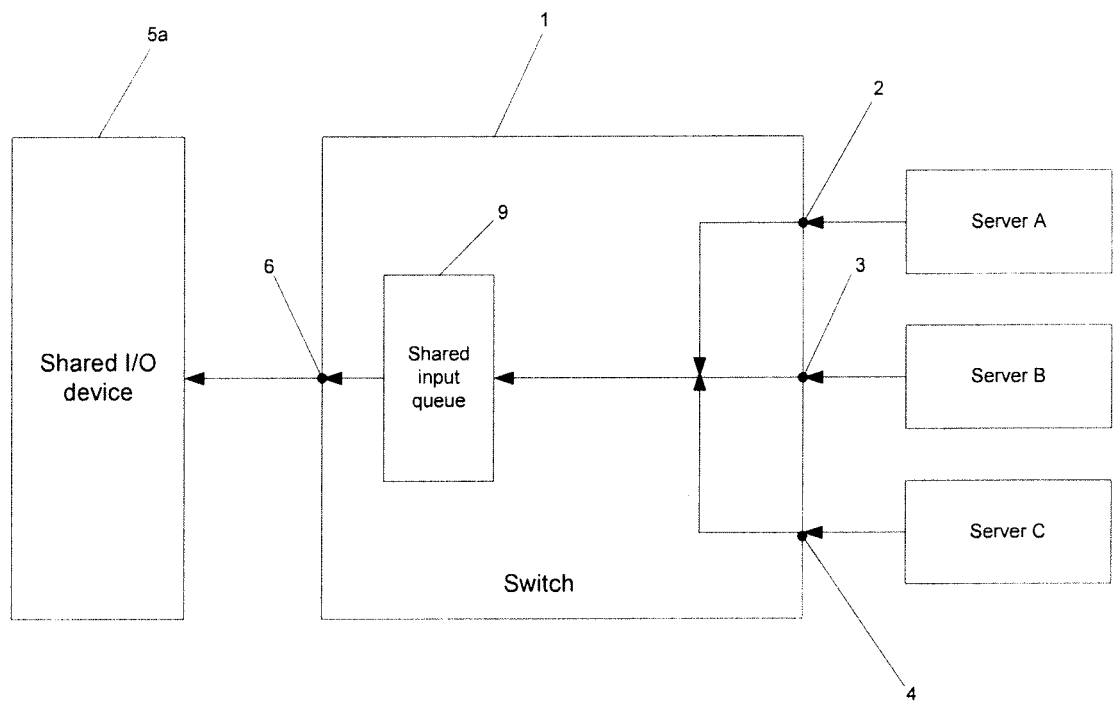
FIG. 2 is a schematic illustration of a plurality of servers connected to an I/O device by way of a switch having a shared queue.

FIG. 2 shows part of the arrangement shown in FIG. 1. Here, only the I/O device 5a is shown connected to the switch 1. Data packets are sent from each of the servers A, B, C to the I/O device 5a via the switch 1. The switch 1 has a shared input queue 9. Data packets received from the three servers A, B, C enter the switch 1 via the respective ports 2, 3, 4 and are queued in the shared input queue 9. The shared input queue 9 is processed by removing packets from the head of the queue, and transmitting removed packets to the I/O device 5a via the port 6 of the switch 1. For example, if the server C sends a data packet to the I/O device 5a, the data packet is transmitted from the server C and received by the switch 1 via port 4. The data packet is then stored in the shared input queue 9 until bandwidth is available to transmit the packet to the I/O device 5a through the port 6 of the switch 1. Bandwidth might be unavailable for a variety of reasons, for example if the I/O device 5a is busy, or if a link between the switch 1 and the I/O device 5a is busy.

The shared input queue 9 can be implemented in any suitable way. For example, the shared input queue may be implemented as a first in first out (FIFO) queue. Where the shared input queue 9 is implemented as a FIFO queue packets are received from the three servers A, B, C and are queued as they are received. Packets are then transmitted to the I/O device 5a in the order in which they were received, regardless of the server from which they were received. The shared input queue 9 can be stored within appropriate storage provided by the switch 1, such as appropriate RAM.

It is known to use a plurality of switches in combination to extend the number of devices (i.e. I/O devices and servers) which can be connected together. In such arrangements, it may be advantageous to provide a shared queue at a port where two switches are interconnected. An example of a multiple switch configuration is shown in FIG. 3.

Figure 3:
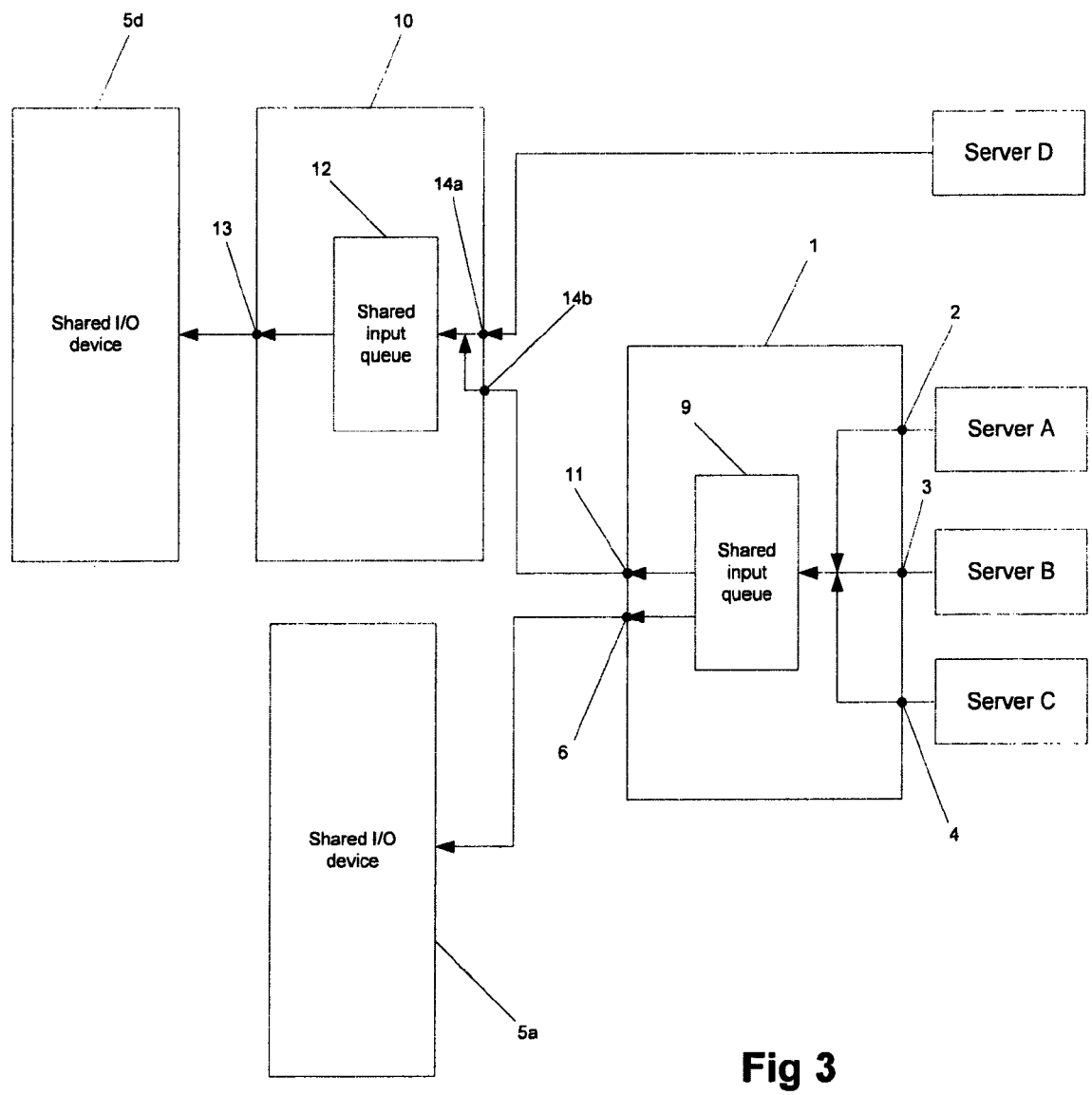
FIG. 3 is a schematic illustration of a plurality of servers connected to a plurality of I/O devices by way of two switches, each switch having a shared queue.

FIG. 3 shows the switch 1 shown in FIG. 2. Additionally, in the arrangement of FIG. 3 a switch 10 is connected to the switch 1 via a port 11. The switch 10 has a shared input queue 12. An I/O device 5d is connected to the switch 10 through a port 13 provided by the switch 10. A further server D is also connected to the switch 10 via a port 14a.

The servers A, B, C send data packets to the shared I/O device 5d via both of the switches 1, 10. A data packet transmitted by, for example the server A, is first received at the switch 1 through the port 2, and is queued in the shared input queue 9 until it can be sent on towards its destination. Upon leaving the shared input queue 9, the data packet is transmitted to the switch 10 through the port 11 of the switch 1 and the port 14b of the switch 10. At the switch 10 the data packet is queued in the shared input queue 12 until it can be forwarded onto the intended destination, which is the I/O device 5d.

Server D sends data packets to the I/O device 5d via the switch 10. Data packets transmitted by the server D are received at the switch 10 through the port 14a, and are queued in the shared input queue 12. As each of servers A, B, C and D may send data packets to the shared I/O endpoint 5d, the shared input queue 12 contains data packets transmitted by each of the servers A, B, C and D. Each of the servers A, B, C are connected to the switch 1, and as such the shared input queue 9 provided by the switch 1 contains data packets transmitted by each of the servers A, B, C.

FIG. 3 shows one way in which the arrangement of FIG. 2 can be modified to allow a larger number of devices to be connected together. It will be readily apparent that other configurations are possible.

An embodiment of the invention is now described in further detail. The embodiment is described with reference to FIG. 4 which shows the general arrangement of FIG. 2 adapted to implement the invention. It will be appreciated that in alternative embodiments of the invention alternative arrangements may be employed including, for example, an arrangement based upon that shown in FIG. 3 and described above, as is discussed further below.

Figure 4:
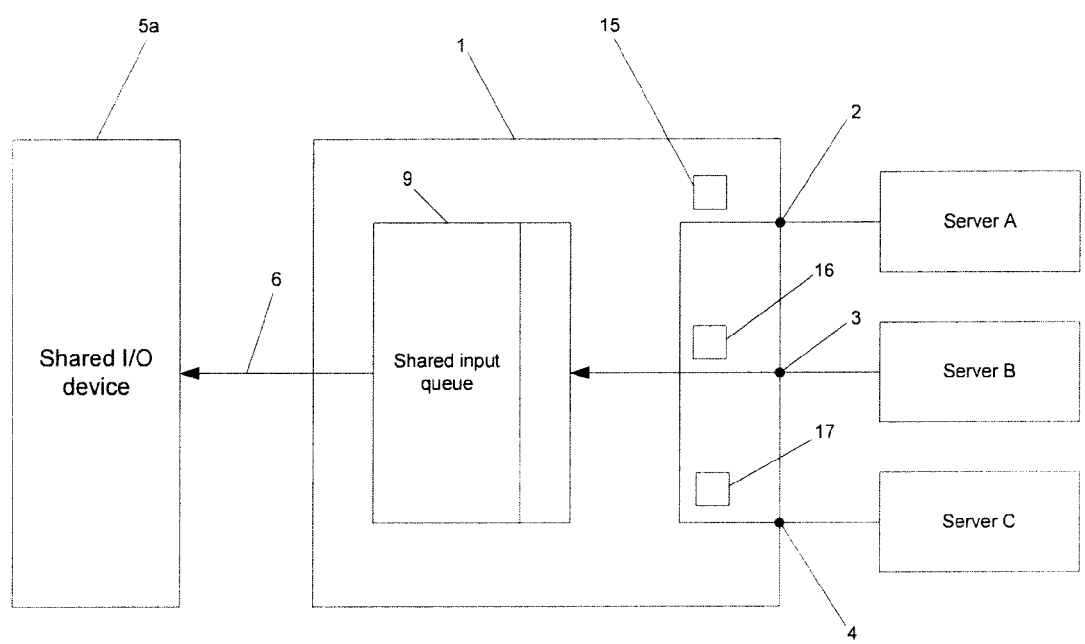
FIG. 4 is a schematic illustration of a plurality of servers connected to an I/O device by way of a switch having a shared queue adapted according to an embodiment of the present invention.

In the arrangement shown in FIG. 4 it can be seen that the switch 1 connects three servers A, B, C and the shared I/O device 5a as described with reference to FIG. 2. The switch 1 again implements a shared input queue 9 which is arranged to store packets received from the servers A, B, C as they are received by the switch 1 and before they are transmitted onwards to the shared I/O device 5a. The switch 1 stores a state parameter for each of the servers A, B, C which is connected to the switch 1. A state parameter 15 is associated with the server A, a state parameter 16 is associated with the server B and a state parameter 17 is associated with the server C. It will be appreciated that if further servers were connected to the switch 1 further state parameters would be stored. Indeed, the switch 1 stores as many state parameters as is necessary to cater for the number of data sources which may be connected to the switch 1. The state parameters 15, 16, 17 are stored in RAM provided by the switch 1.

As data packets are received from the servers A, B, C they are stored in the shared input queue 9 of switch 1. Each data packet is stored together with a value of the state parameter associated with the port through which the data packet was received, the value of the state parameter being determined as the data packet is received by the switch 1. For example, if a data packet is received from the server A through port 2 the value of the state parameter 15 associated with the port 2 (and therefore associated with the server A) when the data packet is received is stored alongside the received data packet in the shared input queue 9. That is, if the state parameter 15 has a value of '1' when a particular data packet is received from Server A by the switch 1 the shared input queue 9 will store the received data packet together with the value '1' in the shared input queue 9.

From the preceding description it can be seen that each received data packet is stored in the shared input queue 9 together with an appropriate value of an appropriate state parameter. When one of the servers A, B, C is reset, this is detected by the switch 1 and the corresponding state parameter 15, 16, 17 is updated in response to the reset.

A reset can be detected by the switch 1 in any convenient way. For example a signal may be received at the switch which is indicative of a reset of one of the servers. Such a signal may be provided in the form of a control data packet. Alternatively, the switch 1 may detect a failure of the link between the switch 1 and one of the servers. Regardless of how a reset is detected by the switch 1, in response to detection of a reset, the corresponding state parameter is updated.

In the described embodiment the update of the corresponding state parameter comprises incrementing the corresponding state parameter. For example, if state parameter 16 has a value of '1' and the server B is reset, this is detected and the state parameter 16 is incremented such that it has the value of '2'.

The processing of the shared input queue 9 is described in more detail with reference to FIGS. 5A and 5B and FIGS. 6A to 6E. In the described example, each of the servers A, B and C sends data packets to the I/O device 5a. The data packets are sent via the switch 1 and are stored together with corresponding state parameters values in the shared input queue 9 in order of receipt.

Figure 5A:
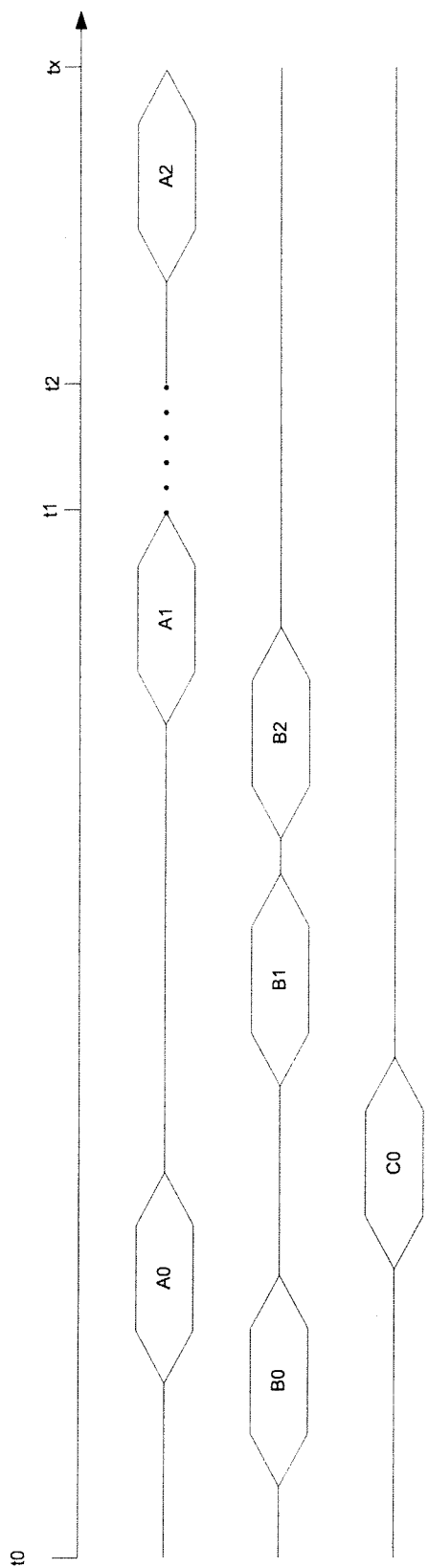
FIG. 5A is a timing diagram showing times of arrival of a stream of data packets arriving at the switch of FIG. 4.

FIG. 5A illustrates the timing relationship between the receipt of data packets at the switch 1. Each data packet is identified by reference to a server from which it was received and a counter indicating how many packets have been received from that server. That is, a data packet denoted A0 is the first data packet received from the server A.

Figure 5B:
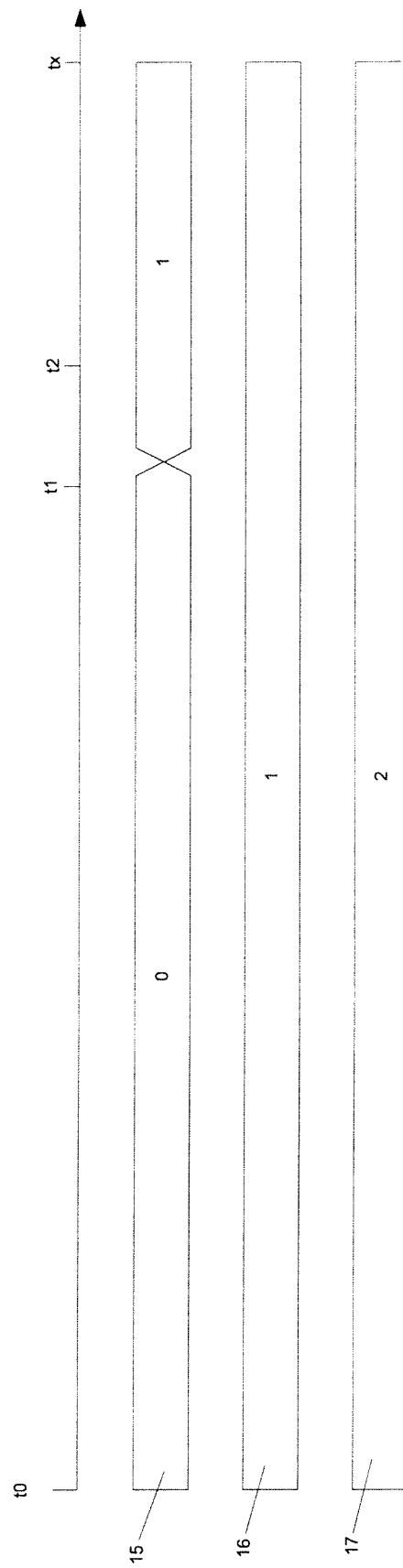
FIG. 5B is a timing diagram showing how values of state parameters change during receipt of the stream of data packets shown in FIG. 5A.

FIG. 5B shows changes in the values of the state parameters 15, 16, 17. It can be seen that between times t0 and t1 the state parameter 15 has a value of '0', the state parameter 16 has a value of '1' and the state parameter 17 has a value of '2'. At time t1 the value of the state parameter 15 is changed from '0' to '1', while the values of the state parameters 16, 17 remain respectively '1' and '2'. No further changes in state parameter values occur between times t1 and tx. From FIG. 5B it can be seen that the server A was reset at time t1 resulting in the state parameter 15 being incremented.

Figure 6A:
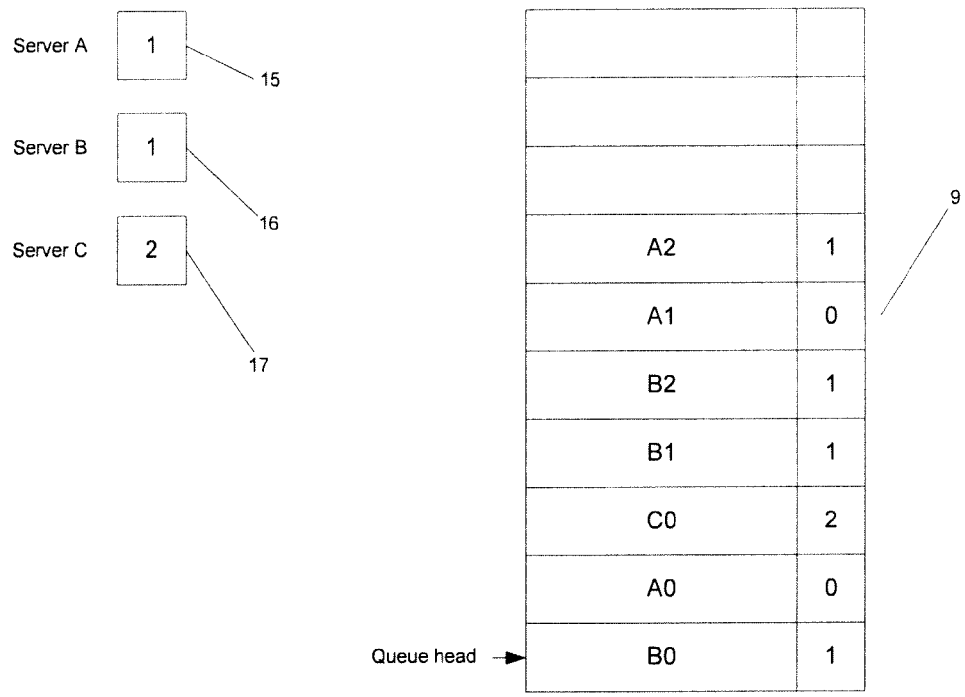
FIGS. 6A to 6E are schematic illustrations showing the processing of the shared queue in the embodiment of the present invention shown in FIG. 4.

FIG. 6A shows the shared input queue 9 after receipt of all data packets shown in FIG. 5A. It can be seen that the data packet at the head of the shared input queue 9 is data packet B0 given that this was the first data packet received at the switch 1. The data packet B0 is stored in the shared input queue 9 together with the value of the state parameter 16 when the data packet B0 is received, i.e. a value of '1'. A next data packet stored in the shared input queue 9 is the data packet A0 received from the server A. The data packet A0 is stored together with a value '0', which is the value of the state parameter 15 when the data packet A0 is received at the switch 1. The next data packet stored in the shared input queue 9 is the data packet C0 received from the server C. The data packet C0 is stored in the shared input queue 9 together with a value '2', which is the value of the state parameter 17 when the packet C0 is received at the switch 1.

Next in the shared input queue 9 are stored two data packets received from the server B, the data packets B1 and B2, both of which are stored together with a value of '1' which is the value of state parameter 16 when these packets are received at the switch 1. The data packet B2 is followed in the shared input queue 9 by a data packet A1 received from the server A and stored together with a value of '0', that being the value of the state parameter 15 when the data packet A1 is received at the switch 1.

Between times t1 and t2 the server A is reset, resulting in the state parameter 15 being incremented as described above. Following this reset of the server A, the data packet A2 is received from the server A and is added to the shared input queue 9. Now, the data packet A2 is stored in the shared input queue 9 with a value of '1' following update of the state parameter 15.

FIG. 6A also shows the values of the state parameters 15, 16, 17 after receipt of all packets shown in the shared input queue 9 in FIG. 6A. It is assumed, for the purposes of example only, that all data packets shown in FIG. 5A are received at the switch 1 and are added to the shared input queue 9 before any of the received packets leave the shared input queue 9. That is, following receipt of the data packets shown in FIG. 5A, the shared input queue 9 and the state parameters 15, 16, 17 have the state shown in FIG. 6A.

Processing of the shared input queue 9 is now described with reference to FIGS. 6A to 6E.

The shared input queue 9 is processed as a FIFO queue. That is, a data packet at the head of the queue is the data packet which is considered for transmission. To determine whether the data packet at the head of the shared input queue 9 should be transmitted, the port through which the data packet was received (and consequently a server from which the data packet was received) is determined from information contained within the header of the stored packet. The value of the state parameter stored alongside the processed data packet is then compared with the current value of the appropriate state parameter corresponding to the port on which the data packet was received. So, when the queue illustrated in FIG. 6A is processed, the data packet B0 is considered for transmission. Given that this data packet was received from the server B the relevant state parameter is the state parameter 16, which has a value of '1' when the shared input queue shown in FIG. 6A is processed. It can be seen that the data packet B0 is stored alongside a value of '1'. Given that the value stored alongside the data packet B0 ('1') is equal to the current value of the relevant state parameter it can be determined that the server B has not been reset since receipt of the data packet B0, and as such the data packet B0 is transmitted.

Figure 6B:
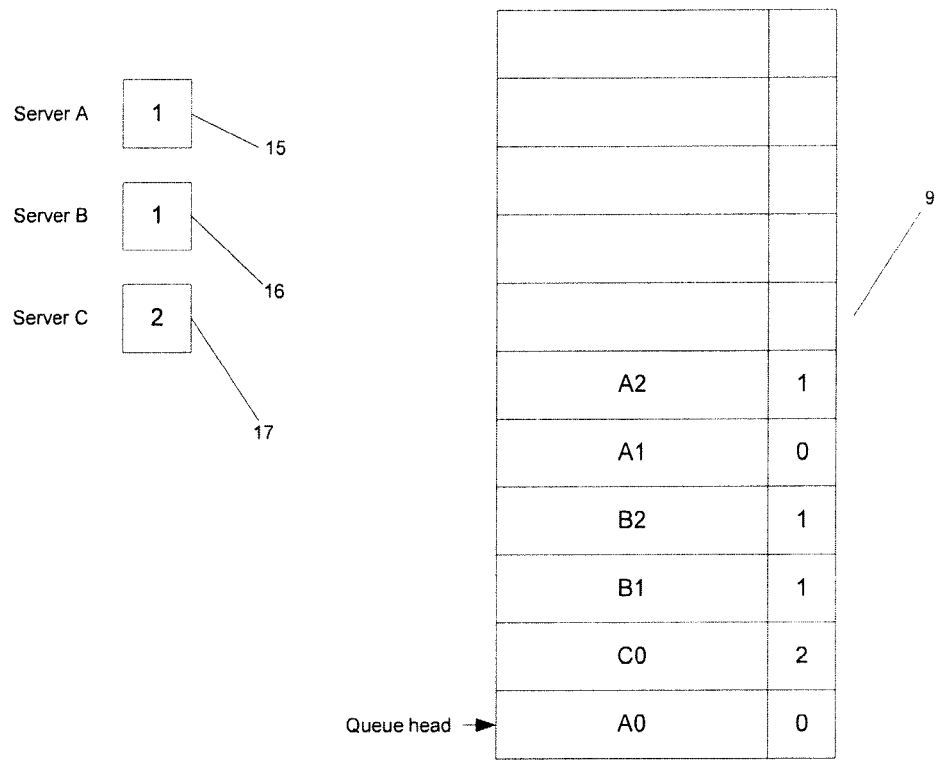

FIG. 6B shows the state of the shared input queue 9 after data packet B0 has been transmitted. Data packet A0 is now at the head of shared input queue 9 and is therefore processed. The data packet A0 was received from server A. The state parameter value ('0') stored alongside the data packet A0 does not match the current value ('1') of the corresponding state parameter 15. This indicates that server A has been reset since sending data packet A0 and data packet A0 should therefore not be transmitted from the switch 1 to the I/O device 5a. The data packet A0 is therefore discarded without transmission.

Figure 6C:
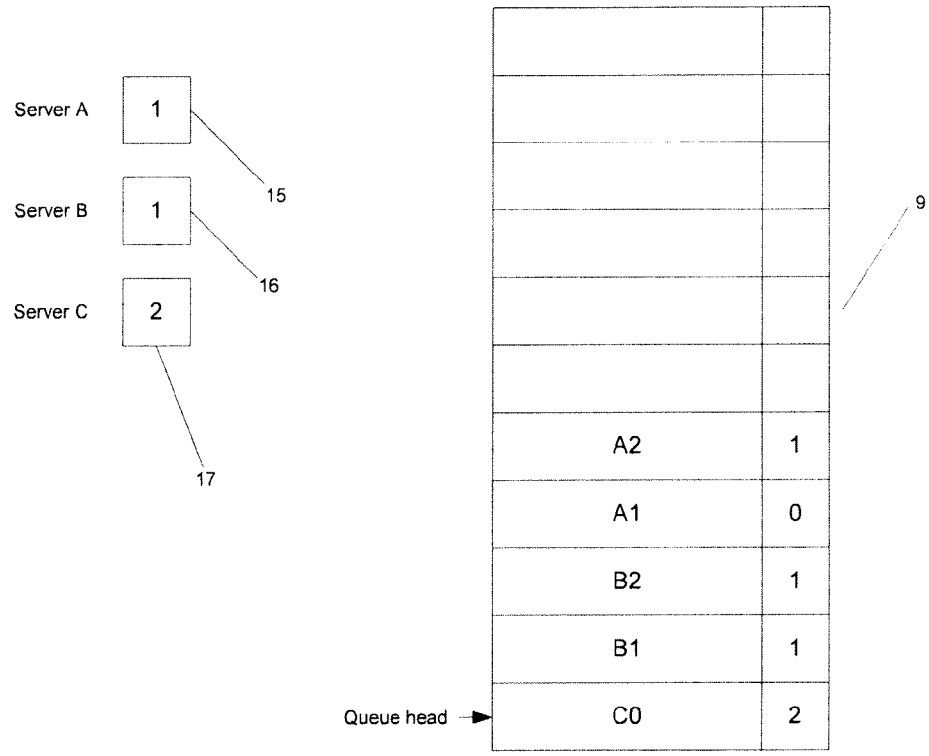

FIG. 6C shows the state of shared input queue 9 after the data packet A0 has been processed. The data packet at the head of the shared input queue 9 is now the data packet C0. The state parameter value stored alongside the data packet C0 ('2') is equal to the current value of state parameter 17 indicating that server C has not been reset since sending data packet C0. The data packet C0 is therefore transmitted from the switch 1 to the shared I/O device 5a. Data packets B1 and B2 are similarly processed. That is, the state parameter values stored alongside each of the data packets B1 and B2 match the current value of the state parameter 16 and so the data packets B1 and B2 are transmitted from the switch 1 to the I/O device 5a.

Figure 6D:
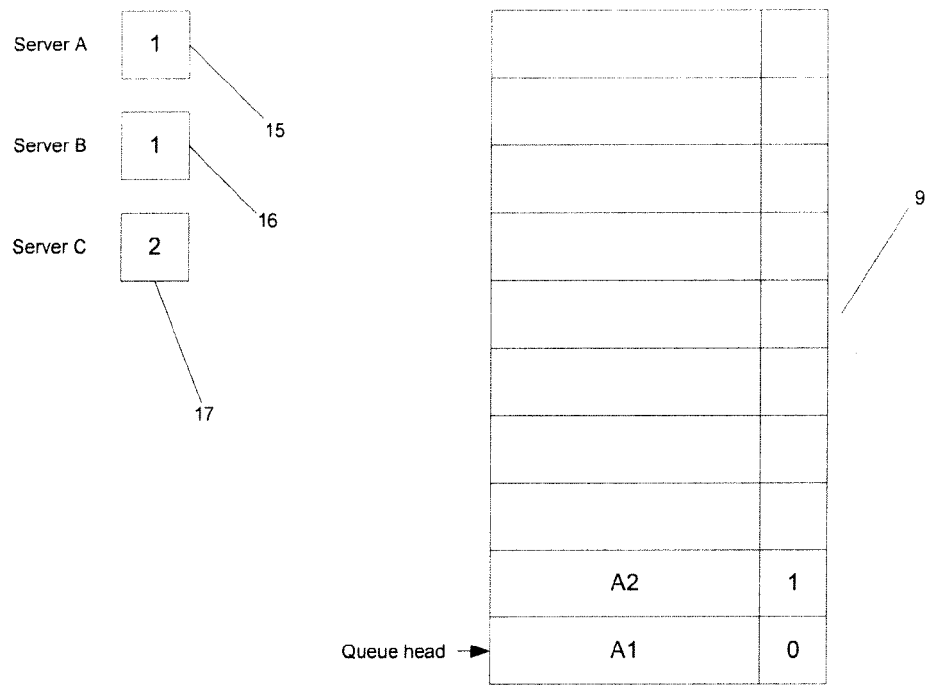

FIG. 6D shows the state of the shared input queue 9 after data packets C0, B1 and B2 have been transmitted as described with reference to FIG. 6C. The data packet at the head of the shared input queue 9 is the data packet A1. The state parameter value stored alongside data packet A1 is '0' which does not match the current value, '1', of relevant state parameter 15. This indicates that a reset of server A has occurred subsequent to the sending of data packet A1. The data packet A1 is therefore invalid and is discarded.

Figure 6E:
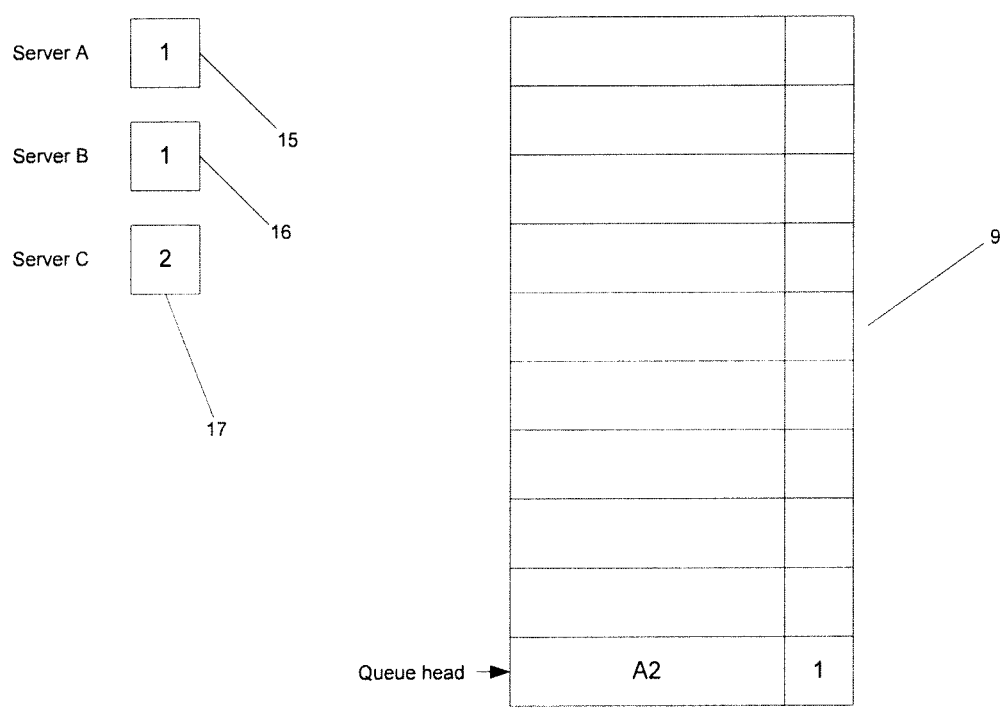

In FIG. 6E the data packet A2 is at the head of the shared input queue 9. The data packet A2 was sent by the server A after the server A was reset. The state parameter value ('1') stored alongside data packet A2 matches the current value of the relevant state parameter 15 indicating that server A has not been reset subsequent to sending data packet A2. Data packet A2 is therefore transmitted to the I/O device 5a.

Figure 7:
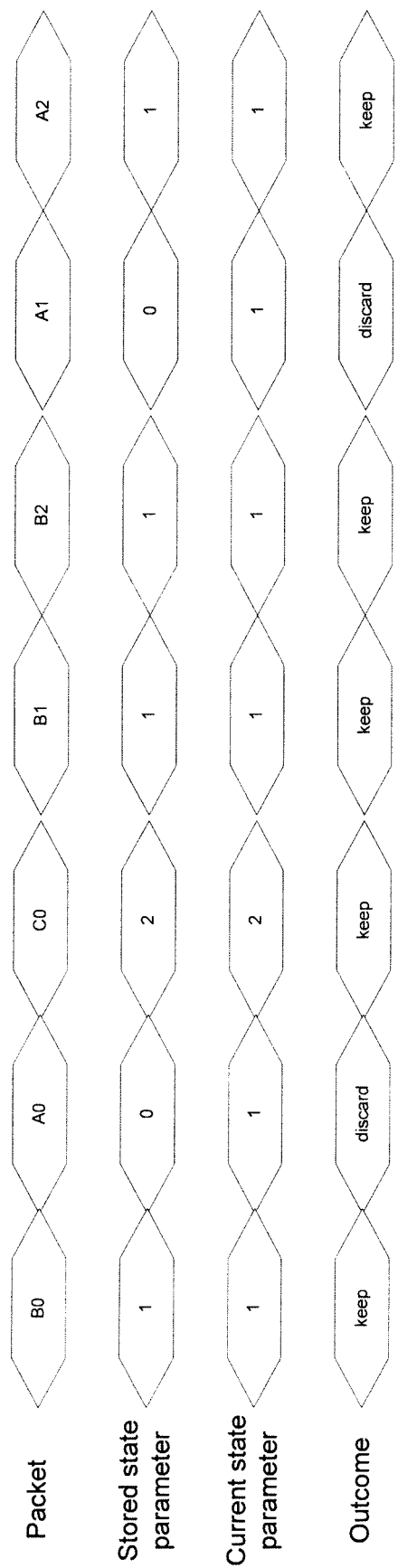
FIG. 7 is a schematic illustration showing comparisons performed during the processing described with reference to FIGS. 6A to 6E and the result of each comparison.

FIG. 7 illustrates the comparisons performed during the processing described with reference to FIGS. 6A to 6E and the result of each comparison. It can be seen that the data packets A0 and A1 are discarded as the value of the state parameter stored alongside the data packets A0 and A1 does not match the current value of state parameter 15. All other data packets are transmitted.

It will be appreciated that although in this example the servers A, B, C are acting as the data source sending data packets to the shared I/O device 5a, data packet traffic may equally flow in the other direction, i.e. the shared I/O device 5a may send data packets to one or more of the servers A, B, C utilising the same queue processing method. In such a case data packets may be stored in a queue together with a value of the state parameter associated with a server to which the data packets are to be transmitted. That is, the method described above may be applied using state parameters associated with destinations (rather than sources) of data packets. It will similarly be appreciated that the state parameters used in the queuing method may be associated with the I/O devices rather than with the servers.

Where an embodiment of the invention is based upon an arrangement similar to that of FIG. 3, each switch port stores one state parameter for each unique ingress flow passing through the port. That is, the port 14b of the switch 10 to which the switch 1 is connected has three state parameters, one for each of the servers A, B, C. Given that the shared queue 12 is shared by each of the servers A, B, C, D, four state parameters will be maintained in total, one for each of the servers.

The I/O device 5d, has four returning data flows, one to each of the servers A, B, C, D. As such four state parameters will need to be associated with the port 13 of the switch 10 to which the I/O device 5d is connected. The state parameters associated with the server A at port 13 (ingress, I/O to server) and port 14b (ingress server to I/O), do not have to be kept synchronous, or even be initialised to a common value. What matters is the local value at each port, so that a reset at that port can be detected as described above.

Usually, a reset is initiated by the server, and will propagate downwards to the I/O devices. However, the server can reset part of its hierarchy, for example from port 13 downwards, without resetting ports 14b, 11 or 2, so in this situation the state parameters at the various ports are updated differently. In this case only the relevant state parameter associated with the port 13 is updated.

The state parameters may be implemented in any suitable way. For example, the state parameter may be implemented as a counter where the counter size is determined by the minimum reset frequency and the maximum latency for data packets within the shared queue. A 2-bit counter will provide a suitable range of values for many applications.

In the preceding description it has been described that data packets are stored in a queue, and particularly a FIFO queue. It will be appreciated that embodiments of the invention can use any suitable queue. Furthermore, it will be appreciated that embodiments of the invention are not restricted to the use of queues, but can instead use any appropriate storage buffer which can be implemented in any convenient way.

The preceding description has described embodiments of the invention where data packets are transmitted from a plurality of different servers. It will be appreciated that data packets may be transmitted from a plurality of different entities of any kind. For example, the entities may take the form of operating system instances operating on a single server. It will further be appreciated that the term server is intended broadly and is intended to cover any computing device.

While it is the case that embodiments of the present invention as described above have particular relevance to shared I/O applications, the method is generally applicable to any shared queuing arrangement in which devices may be reset and in which the resetting of devices should affect the processing of queued data packets. Indeed, shared queuing technology has widespread application in the areas of networking, data communication and other data processing systems for improving cost and efficiency.

Further modifications and applications of the present invention will be readily apparent to the appropriately skilled person from the teaching herein, without departing from the scope of the appended claims.

The invention claimed is:

1. A method of processing data packets in a switching device comprising a plurality of ingress and egress ports, each port being arranged to store a respective state parameter for each unique ingress flow passing through said port, each ingress flow being associated with one of a plurality of entities, the switching device being arranged to switch data packets received at one of said ports to another one of said ports, each data packet being associated with one of said plurality of entities, each of said entities being distinct from said switching device, the method comprising:

receiving a first data packet at a first one of said ports, the first data packet being associated with a first one of said entities;

storing said received first data packet in a buffer at the switching device;

storing first state parameter data associated with said first data packet at the switching device, the first state parameter data being based upon a value of a state parameter stored at the first port and associated with said first entity; and processing said first data packet in said buffer based upon said first associated state parameter data and said state parameter stored at the first port;

receiving a second data packet at a second one of said plurality of ports, the data packet being associated with said first one of said entities;

storing said received second data packet in a buffer at the switching device;

storing second state parameter data associated with said second data packet at the switching device, the second state parameter data being based upon a value of a state parameter stored at the second port and associated with said first entity; and processing said second data packet in said buffer based upon said second associated state parameter data and said state parameter stored at the second port;

wherein each state parameter is updateable in response to at least one event associated with an entity associated with said unique ingress flow, the state parameter data indicating an operational state of said entity.

2. A method according to claim 1, wherein said processing said first data packet comprises:

processing the first state parameter data associated with said first data packet with reference to a current value of the first state parameter associated with said first entity.

3. A method according to claim 2, wherein if said processing indicates a first relationship between said first state parameter data associated with first data packet and the current value of said first state parameter associated with said first entity the method further comprises:

transmitting said first data packet to at least one destination associated with the first data packet.

4. A method according to claim 3, wherein said first relationship is equality.

5. A method according to claim 2, wherein if said processing indicates a second relationship between said first state parameter data associated with said first data packet and the current value of said first state parameter associated with the first entity the method further comprises:

discarding said first data packet.

6. A method according to claim 1, wherein said buffer is a queue.

7. A method according to claim 6, wherein said queue is a first-in, first-out queue.

8. A method according to claim 1, wherein a state parameter associated with an entity is updated in response to at least one event associated with said entity.

9. A method according to claim 8, wherein said event is a reset.

10. A method according to claim 1 wherein said state parameter is a counter.

11. A method according to claim 1, wherein said first entity is a source of said first data packet.

12. A method according to claim 1, wherein said first entity is a destination of said first data packet.

13. A method according to claim 1, wherein said first entity is a computing device.

14. A method according to claim 1 wherein said first entity is a computer program running on a computing device.

15. A method according to claim 1 wherein said first state parameter data is stored in said buffer.

16. A method according to claim 15 wherein said first state parameter data is stored in said buffer alongside said first data packet.

17. A method of storing data packets in a buffer of a switching device, the switching device comprising a plurality of ingress and egress ports, each port being arranged to store a respective state parameter for each unique ingress flow passing through said port, each ingress flow being associated with one of a plurality of entities, the switching device being arranged to switch a data packet received at one of said ports to another one of said ports, each data packet being associated with one of said plurality of entities, each of said entities being distinct from said switching device, the method comprising:

receiving at a first port a first data packet associated with a first one of said plurality of entities;

determining a value of first updateable state parameter stored at said first port and associated with said first one of said plurality of entities, the first state parameter comprising an indicator of the operational state of said first one of said plurality of entities;

storing said first data packet in a first buffer of the switching device;

storing first state parameter data at the switching device based upon said determined value of said first state parameter;

receiving at a second port different to said first port a second data packet, the second data packet being associated with said first one of said plurality of entities;

determining a value of a second updateable state parameter stored at said second port and associated with said first one of said plurality of entities, the second state parameter comprising an indicator of the operational state of said first one of said plurality of entities;

storing said second data packet in a second buffer at the switching device; and storing second state parameter at the switching device based upon said determined value of said second state parameter.

18. A method according to claim 17, wherein said queue is a first-in, first-out queue.

19. A method according to claim 17, wherein said first state parameter is a counter.

20. A method according to claim 17, wherein said first entity is a source of said first data packet.

21. A method according to claim 17, wherein said first entity is a destination of said first data packet.

22. A method according to claim 17, wherein said first state parameter data is stored in said buffer.

23. A method according to claim 22, wherein said first state parameter data is stored in said buffer alongside said first data packet.

24. Apparatus for processing data packets, the apparatus comprising;
a memory storing processor readable instructions; and
a processor configured to read and execute instructions stored in said memory;
wherein said processor readable instructions comprise instructions controlling the processor to carry out a method according to claim 1.

25. A non-transitory carrier medium carrying a computer program comprising instructions controlling the computer to carry out a method according to claim 1.

26. A switching device for switching data packets, each data packet being associated with one of a plurality of entities, each of said entities being distinct from said switching device, the switching device comprising:

a first port adapted to receive a first data packet associated with a first one of said plurality of entities and a second port adapted to receive a second data packet associated with said first one of said plurality of entities, each port being arranged to store a respective state parameter for each unique ingress flow passing through said port, each ingress flow being associated with one of said plurality of entities;

a memory adapted to store said received data packets associated with said first one of a plurality of entities in a buffer;

a memory storing first state parameter data associated with said stored first data packet and second state parameter data associated with said stored second data packet, the first state parameter data being based upon a value of an updateable state parameter stored at the first port and associated with said first one of said plurality of entities, the second state parameter data being based upon a value of an updatable state parameter stored at the second port and associated with said first one of said plurality of entities, the first and second state parameter data comprising an indicator of the operational state of said first one of said plurality of entities; and a processor processing said first data packet in said buffer based upon said first state parameter data and processing said second data packet in said buffer based upon said second state parameter data.

27. Apparatus according to claim 26, wherein said buffer is a queue.

28. Apparatus according to claim 26 wherein said processor is configured to:
select a data packet for processing; and
process the state parameter data associated with said selected data packet with reference to a current value of the state parameter associated with said respective entity.

29. Apparatus according to claim 26, wherein the apparatus is a switching device.

* * * * *

UNITED STATES PATENT AND TRADEMARK OFFICE
CERTIFICATE OF CORRECTION

PATENT NO. : 8,644,326 B2
APPLICATION NO. : 12/410704
DATED : February 4, 2014
INVENTOR(S) : Finbar Naven It is certified that error appears in the above-identified patent and that said Letters Patent is hereby corrected as shown below:

In the Claims

In column 10, line 7, In Claim 1, after "entity;" delete "and".

Signed and Sealed this
Sixth Day of May, 2014

Michelle K. Lee
*Deputy Director of the United States Patent and Trademark Office*